Nov. 7, 1950  R. H. DAVIES  2,528,499
FUEL TANK

Filed April 6, 1945  3 Sheets-Sheet 1

INVENTOR.
Robert H. Davies
BY
Mason, Porter & Diller
ATTORNEYS.

Nov. 7, 1950 — R. H. DAVIES — 2,528,499
FUEL TANK
Filed April 6, 1945 — 3 Sheets-Sheet 2

INVENTOR.
Robert H. Davies
BY
Mason, Porter & Diller
ATTORNEYS.

Nov. 7, 1950   R. H. DAVIES   2,528,499
FUEL TANK
Filed April 6, 1945   3 Sheets-Sheet 3
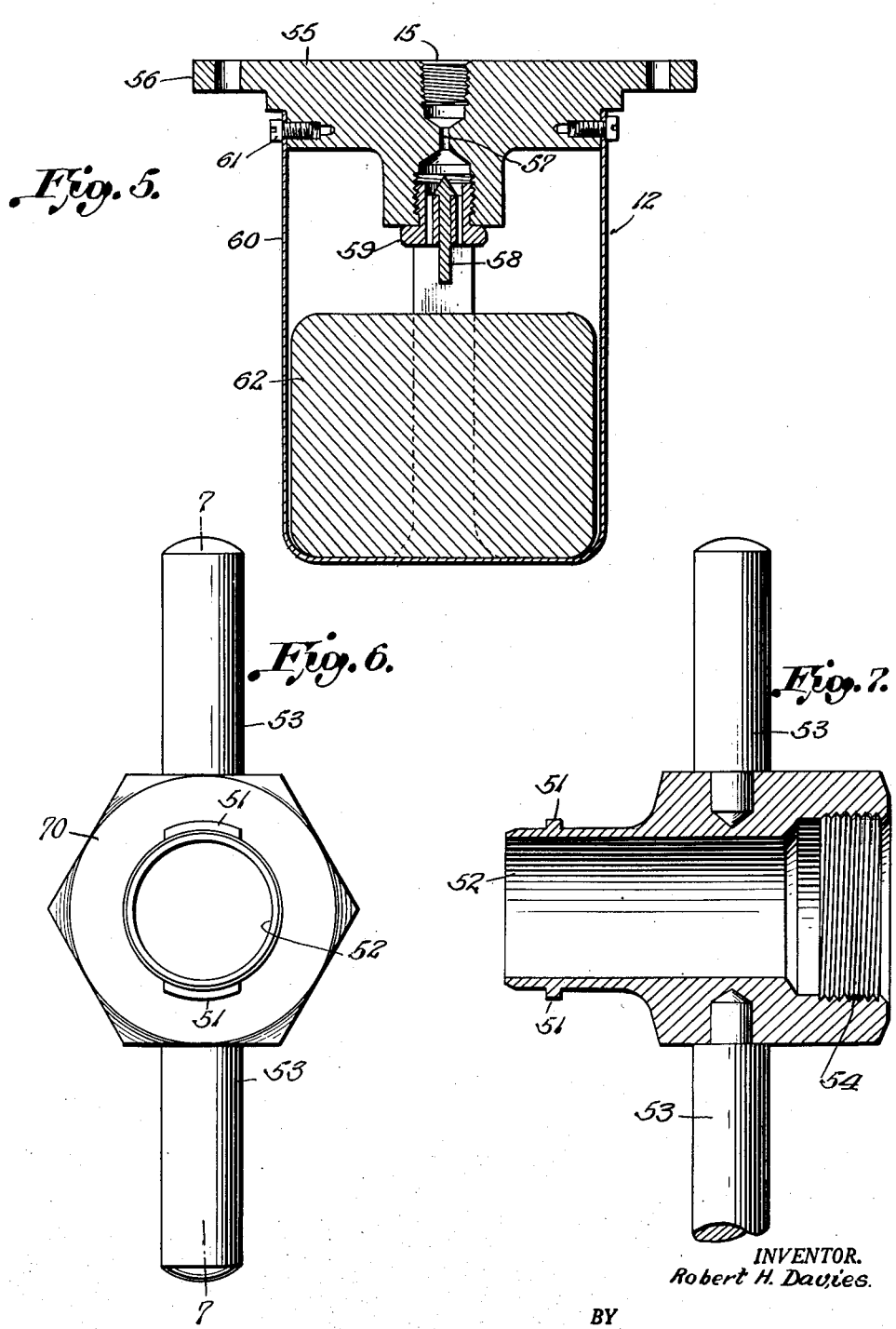
INVENTOR.
Robert H. Davies.
BY
Mason, Porter & Diller
ATTORNEYS.

Patented Nov. 7, 1950

2,528,499

UNITED STATES PATENT OFFICE 2,528,499

FUEL TANK

Robert H. Davies, Cleveland, Ohio, assignor to The Parker Appliance Company, Cleveland, Ohio, a corporation of Ohio Application April 6, 1945, Serial No. 586,872

4 Claims. (Cl. 137—68)

1

The present invention relates to fuel tanks and more particularly to such tanks which will permit refueling from the bottom thereof.

An important object of the invention is to provide means which will permit refueling of a fuel tank from the bottom thereof and means associated therewith for automatically shutting off the incoming fluid when the tank is full.

Another object of the invention is to provide a fuel tank having a valve controlled inlet in the bottom thereof adapted to receive the refueling nozzle, the pressure of the incoming fluid unseating the valve and permitting fuel to flow into the tank.

A further object of the invention is to provide means in the form of a pilot valve attached to the top of the tank and in direct communication with the valve controlled inlet for automatically shutting off the incoming fluid when the tank is full.

These and other objects will in part be obvious and will in part be more fully disclosed in the drawings which show one embodiment of the invention.

In the drawings, Figure 1 is a schematic diagram of a fuel tank embodying the means for filling from the bottom thereof and the automatic shut-off means.

Figure 5 is a vertical sectional view of the float controlled pilot valve, the same being detached from the upper wall of the tank.

Figure 6 is a top plan view of the refueling nozzle which is to be associated with the main inlet valve when filling the tank.

Figure 7 is a sectional view of the refueling nozzle being taken substantially on line 7—7 of Figure 6.

Figure 1:
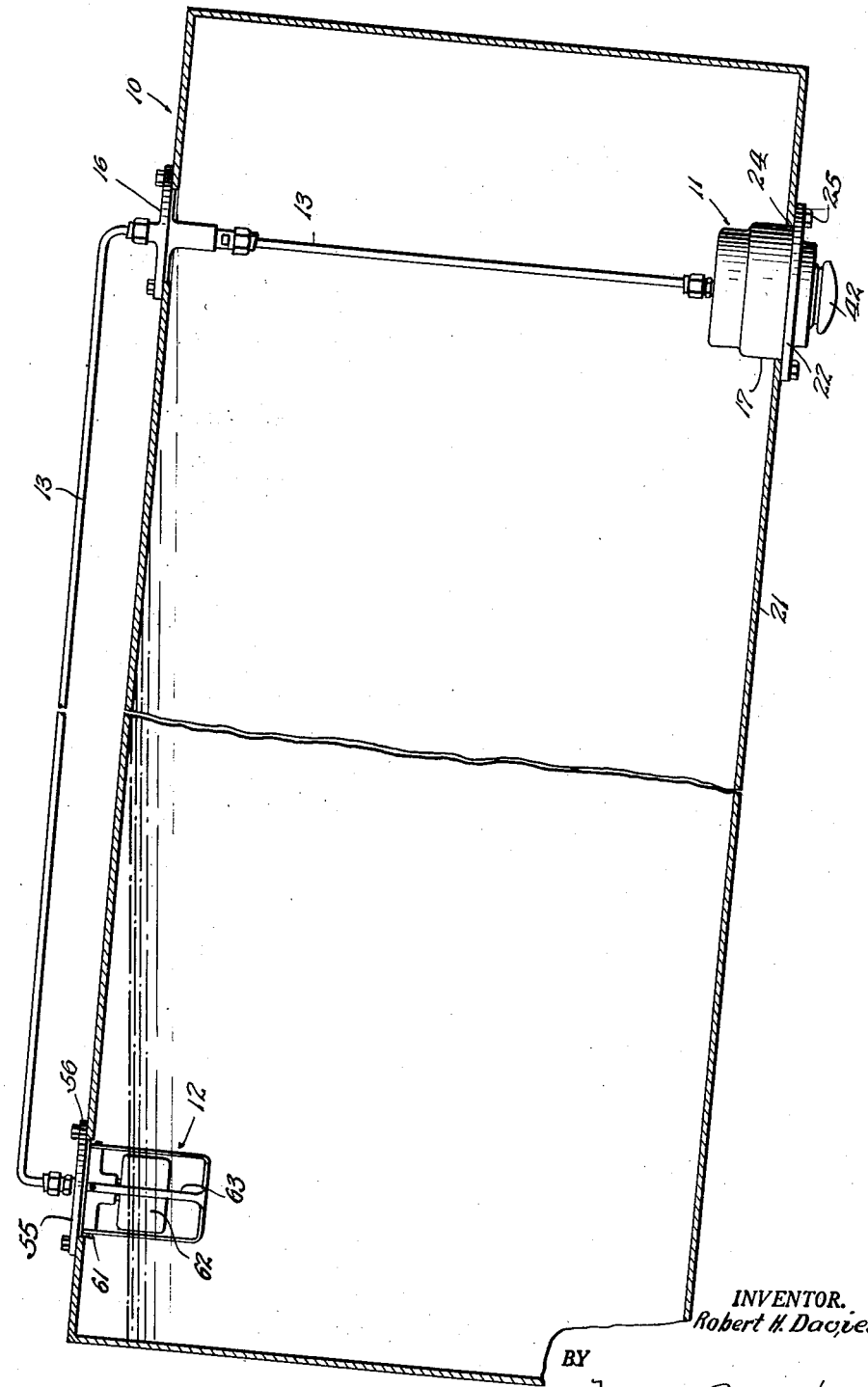

Referring to the drawings for a more detailed description thereof, a fuel tank of well-known construction is generally designated by the reference numeral 10, the bottom wall of said tank supporting a main inlet valve 11 while the top wall thereof supports a pilot valve 12. The valves 11 and 12 are connected by means of a pipe 13 one end of which is coupled to the extension 14 of the main inlet valve 11 and the other end of which is coupled with the port 15 of the pilot valve 12. The pipe 13 is preferably formed of two sections which are united by a coupling or

2 the like 16 attached to the top of the tank 10. As will hereinafter appear, fuel entering the inlet valve 11 will pass upwardly through the pipe 13 and into the pilot valve 12. The main portion of the fuel, however, will enter the tank from a suitable outlet provided in the valve 11.

Figure 2:
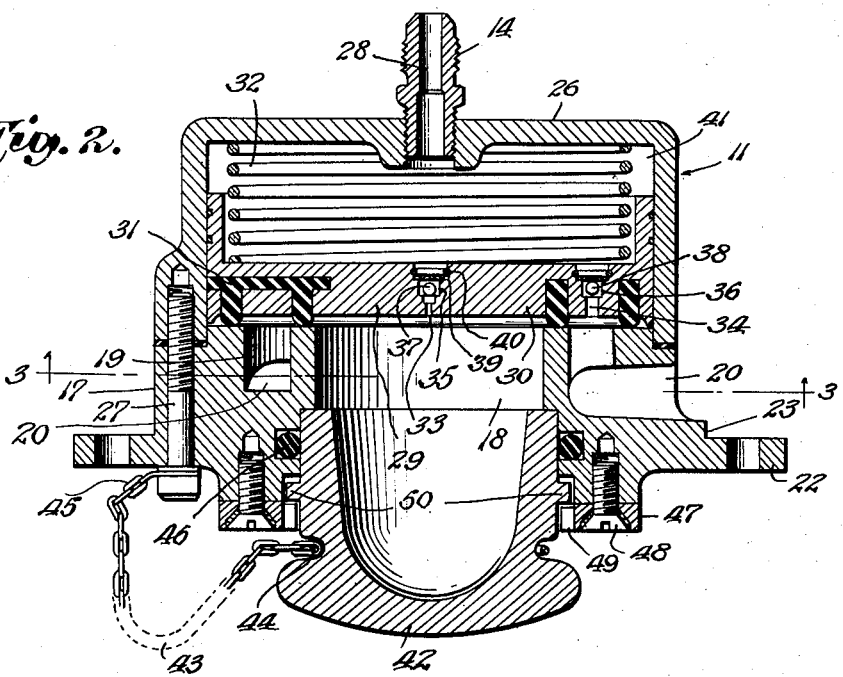
Figure 2 is a vertical sectional view through the main inlet valve which is attached to the bottom wall of the tank.
Figure 4:
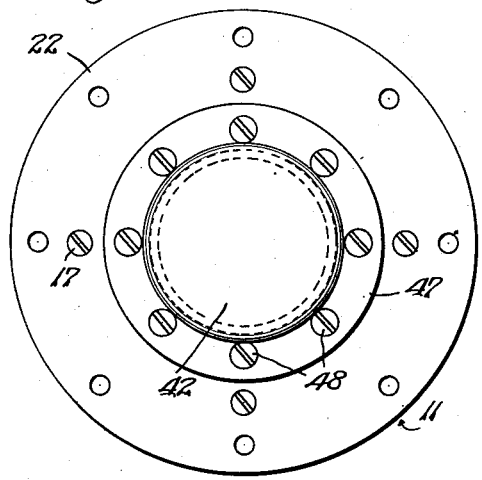
Figure 4 is a bottom plan view of the main inlet valve detached from the tank.
Figure 3:
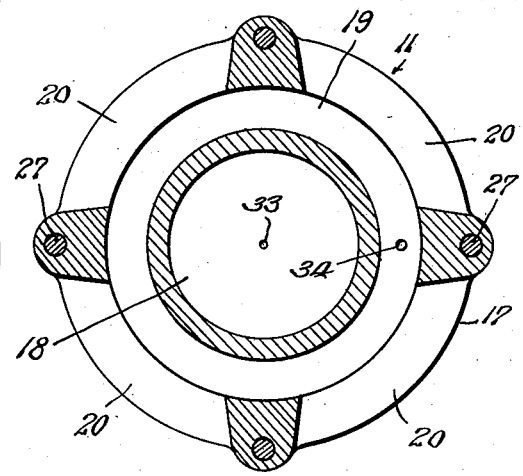
Figure 3 is a horizontal sectional view taken substantially on line 3—3 of Figure 2.

The main inlet valve 11 is more particularly shown in Figures 2, 3 and 4 of the drawings, the same comprising a cylindrical casing 17 having an inlet 18 and four passages 20 spaced annularly of the casing which communicate with an annular space 19. The annular space 19 entirely surrounds the casing 17 as shown in Figure 3 and the passages 20 communicate therewith in a manner whereby fuel admitted through the inlet 18 will be discharged into the space 19 and from said space to the passage 20 for discharge into the tank 10. The casing 17 is attached to the bottom wall 21 of the tank 10 through the annular flange 22 which flange is formed with an annular shoulder 23 equal to the diameter of the opening 24 formed in the bottom wall 21. The flange 22 is attached to the tank by means of screws or the like 25. Thus it will be seen that the casing 17 extends upwardly within the tank 10 while being fixedly secured to the bottom wall thereof through the annular flange 22 and screws 25.

The main inlet valve 11 further includes a cup-shaped member 26 which is attached to the casing 17 by cap screws or the like 27, the cup-shaped member 26 and casing 17 forming a substantially unitary construction. This cup-shaped member 26 is closed except for the opening 28 in the coupling member 14 to which the pipe 13 leading to the pilot valve 12 is connected.

A piston type valve 29 is slidably supported in the cup-shaped member 26 and is of the type disclosed in the patent granted Arthur L. Parker, September 2, 1947, No. 2,426,900. The bottom wall 30 of the valve 29 is provided with packing members 31 which normally engage the inner wall of the casing 17 on opposite sides of the space 19 for sealing said space from the inlet 18. Pressure exerted by the spring 32 maintains the valve including the packing members 31 in sealing engagement with the casing 17. As will hereinafter appear, the valve 29 will be lifted from its seat to permit fluid to enter the space 19 and passages 20 for discharge into the tank only when the pressure differential on opposite sides of the valve 29 is sufficient to overcome the pressure exerted by the spring 32.

The bottom wall 30 of the valve 29 is further formed with a restricted orifice 33 and a second orifice of slightly larger diameter 34. Recesses 35 and 36 communicate with the orifices 33 and 34 respectively in which are positioned ball check valves 37 and 38. These ball check valves 37 and 38 are held in their respective recesses by individual screens and snap rings 39 and 40. The ball check valve 37 is raised by the incoming fluid so that a certain portion thereof will be discharged through the opening 28 into the pipe 13 from where it flows to the pilot valve 12. The ball check 38 will normally be closed by fluid entering the chamber 41 through the orifice 37 but will be opened by any back pressure of fluid created in the tank 10 and entering the casing 17 through the passages 20 and annular space 19.

The inlet 18 of the main valve 11 is normally closed by the closure cap 42 which is in turn prevented from being lost or mislaid by a chain 43 one end of which is attached to the cap as indicated at 44 and the other end of which is attached to the casing as indicated at 45. A gasket 46 in the casing prevents leakage of fuel during refueling and likewise prevents leakage when the cap 42 is in position. The cap 42 is associated with a quick connect adaptor 47 which is attached to the bottom end of the casing by the screws 48. This adaptor is formed with two diametrically opposed slots 49 and the closure cap 42 has corresponding projecting lugs 50 whereby only 90° turning is required to effect connection and disconnection of the cap.

The refueling nozzle 70 shown in Figures 6 and 7 is likewise formed with diametrically opposed projecting lugs 51 which correspond to the slots 49. This refueling nozzle 70 is inserted in the inlet 18 after removal of the cap 42 and when desiring to refuel the tank. The nozzle 70 further includes a central passage 52 adapted to communicate with the inlet 18 and a pair of arms 53 to be engaged when positioning and removing the nozzle. A threaded opening 54 is provided for attaching the nozzle to the pressure line.

The pilot valve is illustrated in Figure 5 of the drawings and comprises a casing 55 having a flange 56 thereon for attachment to the top of a tank. This casing has a central aperture 57 therethrough which communicates with the port 15, said aperture being opened or closed by a valve member 58 slidably mounted in a plug 59 attached to the casing. A cage 60 is attached to the casing by screws 61 said cage supporting a float 62 which is slidably mounted therein. As is to be understood, the float 62 exerts a buoyant force upward when the fuel tank is full and as it moves upwardly it makes contact with the lower end of the slidable valve 58 to close the orifice 57. When the level of the fluid in the tank drops, the float will drop to the position shown in Figure 5 allowing the valve 58 to move downwardly away from the orifice 57.

In the operation of the device, let it be assumed that the tank 10 is empty and that it is desired to fill the same. The closure cap 42 is rotated until the lugs 50 are in alignment with the slots 49 whereupon a downward pull on the cap will release the same from the casing 17. It is, of course, to be understood that the valve member 29 is maintained on its seat by pressure exerted by the spring 32 and that the ball checks 37 and 38 are likewise seated. After removal of the cap 42, the refueling nozzle 70 is then inserted in the inlet port with its lugs 51 in alignment with the slots 49 and locked therein by turning at 90 degrees. Fuel under pressure from its source of supply is then turned on and will enter the inlet 18 from the nozzle 70. The incoming fluid will unseat the ball check 37 filling the chamber 41 prior to its discharge through the pipe 13 into the pilot valve 12 through the port 15 and restricted orifice 57. The orifice 57 is larger than the orifice 33 and accordingly the fuel will pass more rapidly through the former than it can be replenished through the orifice 33 thus resulting in a pressure differential between the inlet 18 and the chamber 41. When this pressure differential exceeds the pressure exerted by the spring 32, the main valve 29 will move away from its seat to permit free flow of fuel into the tank through the passages 19 and annular space 20. The tank, of course, has suitable vents, not shown, at the top thereof to permit the escapement of the air being displaced by the entering fuel. Since the cage 60 and float valve 62 are supported within the tank 10, the float will be acted upon by the incoming fluid and will gradually rise within the cage 60. When the tank is full, the float 62 will have contacted the valve 58 and lifted the same so as to close the orifice 57. When the orifice 57 is closed, the pressure in the inlet 18 and the chamber 41 will be equalized and since the pressure exerted by the spring 32 upon the valve 29 is greater than this equalized pressure, said valve will close to prevent further fuel from entering the tank. With the closing of the valve 29, a shut-off valve associated with the nozzle is then closed and the nozzle removed and the closure cap replaced. Subsequently as the fuel level in the tank drops, the float will drop to permit the valve 58 to open but such opening of this valve has no effect on the main valve 29.

As described above, the valve 29 will be forced toward its seat as soon as the orifice 57 in the pilot valve 12 is closed. By reason of the ball check 38, fluid under pressure cannot leak from inlet 18, orifice 33 and chamber 41 into the tank. Likewise, the ball check 37 prevents fluid from draining from the tank out through passage 18 after the fuel nozzle has been removed, and in addition provides for pressure seating of the valve 29 by the head of fluid in the tank. This arrangement not only makes the main inlet valve a check valve in that fluid can only flow therethrough into the tank, but also makes it a stop valve to prevent fluid from entering the tank after the fluid in the tank has reached a predetermined level. Inasmuch as the valve 29 is fluid pressure seated whether the dominant pressure is within or without the tank, spring 32 is only necessary to overcome the sliding friction of the valve 29 in the cup 26 and to make the valve 29 operate quicker and more positively.

When the valve 29 is closed, the check valve 37 prevents the passage of fluid from the upper side of the valve to inlet side thereof. The check valve 38 is also closed so that the chamber 41 above the valve is a closed chamber except for the connection to the pipe 10 leading to the pilot valve. During fueling, this pipe becomes filled with the fuel and therefore there is a certain head on the fuel in the pipe 10 which bears upon and is distributed over the entire upper surface of the valve and aids in holding the valve firmly seated when in its closed position. Therefore, when the valve is closed, the head within the pilot line will act directly on the valve for holding the same closed whether the float operated pilot is open or closed. The head within the tank proper will gain access to the upper side of the valve through the valve 38, if the head on the tank exceeds the head within the pilot. This insures that the main valve will be held firmly seated after the tank is filled and during the taking of the fuel from the tank for consumption.

While for purposes of illustration a specific type of main valve and pilot valve has been illustrated and described, it is obvious that either of these valves can be of a form other than that shown and it is not intended that this application should be limited to any specific valve structure.

It will also be understood that many changes in the details of construction may be made without departing from the spirit of the invention as set forth in the appended claims.

I claim:

1. In a fuel tank, a casing attached to the bottom of the tank and having an inlet surrounded at its inner end by a valve seat, said casing having outlets leading to the tank, a valve in said casing for closing said inlet, a spring for moving the valve toward said seat, a float controlled pilot valve at the upper side of said tank, a tube connected to said casing above the valve and extending upwardly therefrom and connected at its upper end to said pilot valve, means whereby fluid pressure on the inlet will close said valve when the pilot valve is closed, and means whereby the pressure of the fuel in said tube operates to aid in holding the valve firmly seated when in closed position and pressure in the inlet is relieved.

2. In a fuel tank, a casing attached to the bottom of the tank and having an inlet surrounded at its inner end by a valve seat, said casing having outlets leading to the tank, a valve in said casing for closing said inlet, a spring for moving the valve toward said seat, a float controlled pilot valve at the upper side of said tank, a tube connected to said casing above the valve and extending upwardly therefrom and connected at its upper end to said pilot valve, said valve having a restricted opening therethrough whereby fluid pressure on the inlet will close the valve when the pilot valve is closed, and means whereby the pressure of fuel in said tube operates to aid in holding the valve firmly seated when in closed position and pressure in the inlet is relieved.

3. In a fuel tank, a casing attached to the bottom of the tank and having an inlet surrounded at its inner end by a valve seat, said casing having outlets leading to the tank, a valve in said casing for closing said inlet, a spring for moving the valve toward said seat, a float controlled pilot valve at the upper side of said tank, a tube connected to said casing above the valve and extending upwardly therefrom and connected at its upper end to said pilot valve, said valve having a restricted opening therethrough whereby the fluid pressure on the inlet will close the valve when the pilot valve is closed, and a valve for closing said opening to the passage of fuel from the inner to the outer sides thereof whereby the pressure of the fuel in said tube will operate to aid in holding the valve firmly seated when in closed position and pressure in the inlet is relieved.

4. In a fuel tank, a casing attached to the bottom of the tank and having an inlet surrounded at its inner end by a valve seat, said casing having outlets leading to the tank, a valve in said casing for closing said inlet, a spring for moving the valve toward said seat, a float controlled pilot valve at the upper side of said tank, a tube connected to said casing above the valve and extending upwardly therefrom and connected at its upper end to said pilot valve, said valve having a restricted opening therethrough whereby the fluid pressure on the inlet will close the valve when the pilot valve is closed, and a valve for closing said opening to the passage of fuel from the inner to the outer sides thereof whereby the pressure of the fuel in said tube will operate to aid in holding the valve firmly seated when in closed position and pressure in the inlet is relieved, a restricted passage connecting the tank to the casing above said valve whereby the pressure of the fuel in the tank will operate to aid in holding the valve firmly seated when in closed position, when the head thereon exceeds the head on the tube connecting the casing to the pilot valve, and a check valve for closing said passage to prevent flow of fluid from the casing to the tank.

ROBERT H. DAVIES.

REFERENCES CITED

The following references are of record in the file of this patent:

UNITED STATES PATENTS

| Number | Name | Date |
|---|---|---|
| 545,519 | Mohn | Sept. 3, 1895 |
| 557,975 | Coony | Apr. 7, 1896 |
| 703,805 | Murray | July 1, 1902 |
| 926,400 | Freany | June 29, 1909 |
| 976,222 | Silliman | Nov. 22, 1910 |
| 1,188,112 | Temple | June 20, 1916 |
| 2,211,237 | Langdon | Aug. 13, 1940 |
| 2,384,628 | Krone | Sept. 11, 1945 |
| 2,426,900 | Parker | Sept. 2, 1947 |

FOREIGN PATENTS

| Number | Country | Date |
|---|---|---|
| 347,338 | France | of 1905 |